(12) United States Patent
Stuart

(10) Patent No.: US 7,894,827 B2
(45) Date of Patent: Feb. 22, 2011

(54) METHOD OF IDENTIFYING A DEVICE BY GPS COORDINATES

(75) Inventor: Steven B. Stuart, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 828 days.

(21) Appl. No.: 11/551,512

(22) Filed: Oct. 20, 2006

(65) Prior Publication Data

US 2008/0146225 A1 Jun. 19, 2008

(51) Int. Cl.
*H04Q 7/20* (2006.01)
(52) U.S. Cl. .................... 455/456.1; 455/403
(58) Field of Classification Search .......... 455/418, 455/419, 420, 422.1, 456.1, 561, 446; 370/338, 370/349
See application file for complete search history.

(56) References Cited

U.S. PATENT DOCUMENTS

| | | | |
|---|---|---|---|
| 5,678,182 A * | 10/1997 | Miller et al. ............... | 455/12.1 |
| 5,864,764 A * | 1/1999 | Thro et al. .................. | 455/561 |
| 6,009,116 A | 12/1999 | Bednarek et al. | |
| 6,108,365 A | 8/2000 | Rubin et al. | |
| 6,252,547 B1 | 6/2001 | Perry et al. | |
| 6,370,629 B1 | 4/2002 | Hastings et al. | |
| 2003/0023747 A1 | 1/2003 | Fouquet et al. | |
| 2003/0095520 A1* | 5/2003 | Aalbers et al. .............. | 370/338 |
| 2003/0109254 A1 | 6/2003 | Motegi et al. | |
| 2004/0054732 A1 | 3/2004 | Carter et al. | |
| 2006/0206568 A1 | 9/2006 | Verma et al. | |

OTHER PUBLICATIONS

International Searching Authority, "International Search Report", Jan. 14, 2009, Published in: WO.

* cited by examiner

*Primary Examiner*—Nghi H Ly
*Assistant Examiner*—Myron Wyche
(74) *Attorney, Agent, or Firm*—Fogg & Powers LLC

(57) ABSTRACT

A method of identifying a device based on GPS coordinates is provided. In one embodiment a device is identified by determining earth coordinates for the device. Once the earth coordinates are determined a unique device identifier is created based at least in part on the earth coordinates of the device. After the unique device identifier has been created, the unique device identifier is communicated to at least one other device.

29 Claims, 6 Drawing Sheets

METHOD OF IDENTIFYING A DEVICE BY GPS COORDINATES

BACKGROUND

Many telecommunication devices depend upon a remote management system to provide services which allow the device to operate. One example of such a situation is a cable modem requiring internet access from a server. Often the management system and device are connected to a large open network, such as the internet, and communicate through a common language, such as Internet Protocol (IP). In such a situation, the management system must only provision its services to authorized devices, and not the plethora of other devices that are in possible communication with the management system. Thus, the remote management system must have a method of determining if a particular device is provisioned for the services of the management system.

Conventionally, device identification is accomplished by giving every device a unique serial number. The device can then provide the management system with its unique serial number and the management system can determine whether services are provisioned for a device with that serial number. If the device is not provisioned, as is the case with a new device, the unique serial number of the device must be obtained and input into the management system. This presents a problem in new installations, because often the specific device is unknown prior to the installation. Thus, the management system cannot be provisioned until the specific device is identified.

This commonly occurs with Internet Service Providers (ISPs). ISPs often have one or multiple centralized management systems that are connected to numerous households and businesses via coaxial cable, fiber optics, or telephone line. When a new customer is signed up for internet access, the ISP will not know which modem the customer is going to connect.

To provision services to the new customer, the ISP must obtain the Media Access Control (MAC) serial number (address) of the modem and then input this unique address into the management system. This can present two difficulties. Firstly, obtaining the MAC address may be burdensome. Many ISPs send a technician out to each location to have the technician manually read the MAC address off of the modem. At the very least, the ISPs require that the customer locate and call in the MAC address of their modem. Secondly, the management system cannot be provisioned until the specific modem is purchased or provided. Only after the specific device is known can the MAC address of the device be input into the management system.

As is often the case, customers do not have a modem at the time of purchasing service. This adds an extra level of complexity to the ordering of internet service. After signing up for service, the specific modem to be installed must be identified, the MAC address must be found, communicated to the ISP, and input into the ISP's management system. Once the management system finally obtains the MAC address, the modem can then, using its MAC address, identify itself to the management system. The management system, recognizing the MAC address, will provision internet services to the modem.

One alternative to the above method has been developed, but it too requires added complexity to the installation process. Here, the management system can provision a general code instead of each individual device. This removes the need to input each device serial number into the management system. Provisioning a code, however, adds the need to input the code into each device. Inputting the code into the device can be quite problematic. Most importantly, to allow for input into a device, the device must have a user interface. This can be prohibitively difficult when the device is a small device installed in a home or a device installed in an inconvenient outdoor location.

Similarly, the difficulty in provisioning services to new devices occurs in the installation of many other IP devices, such as Base Transceiver Stations (BTSs). BTSs are commonly used in cellular communications systems, and in other wireless systems such as WiMax. The difficulties are compounded, because electronics are frequently changed due to upgrades and break downs. Installing the new device uses the same process and confronts the same difficulties as the original installation.

For the reasons stated above, and for other reasons stated below which will become apparent to those skilled in the art upon reading and understanding the present specification, there is a need in the art for an efficient method of provisioning services to a device over a network.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment a device is identified by determining earth coordinates for the device. Once the earth coordinates are determined a device identifier is created based at least in part on the earth coordinates of the device. After the device identifier has been created, the device identifier is communicated to at least one other device.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present methods and apparatuses use GPS technology to identify a device based on the location of the device. Identifying a device based upon its location simplifies the installation process of any device that requires provisioning of services from a management system. Since the device IDs are location dependent and not entirely device dependent, provisioning services to the device no longer requires knowledge of the exact device that will be installed. Instead a management system can be immediately provisioned to provide services to a device with only the knowledge of where the device is going to be installed. Replacements also become much easier. A user can simply plug a new GPS identifying device in the place of an old device, and the new device will be automatically provisioned on the management system. Further detail regarding the present methods and apparatuses will now be provided with reference to FIGS. 1A-5.

Figure 1A:
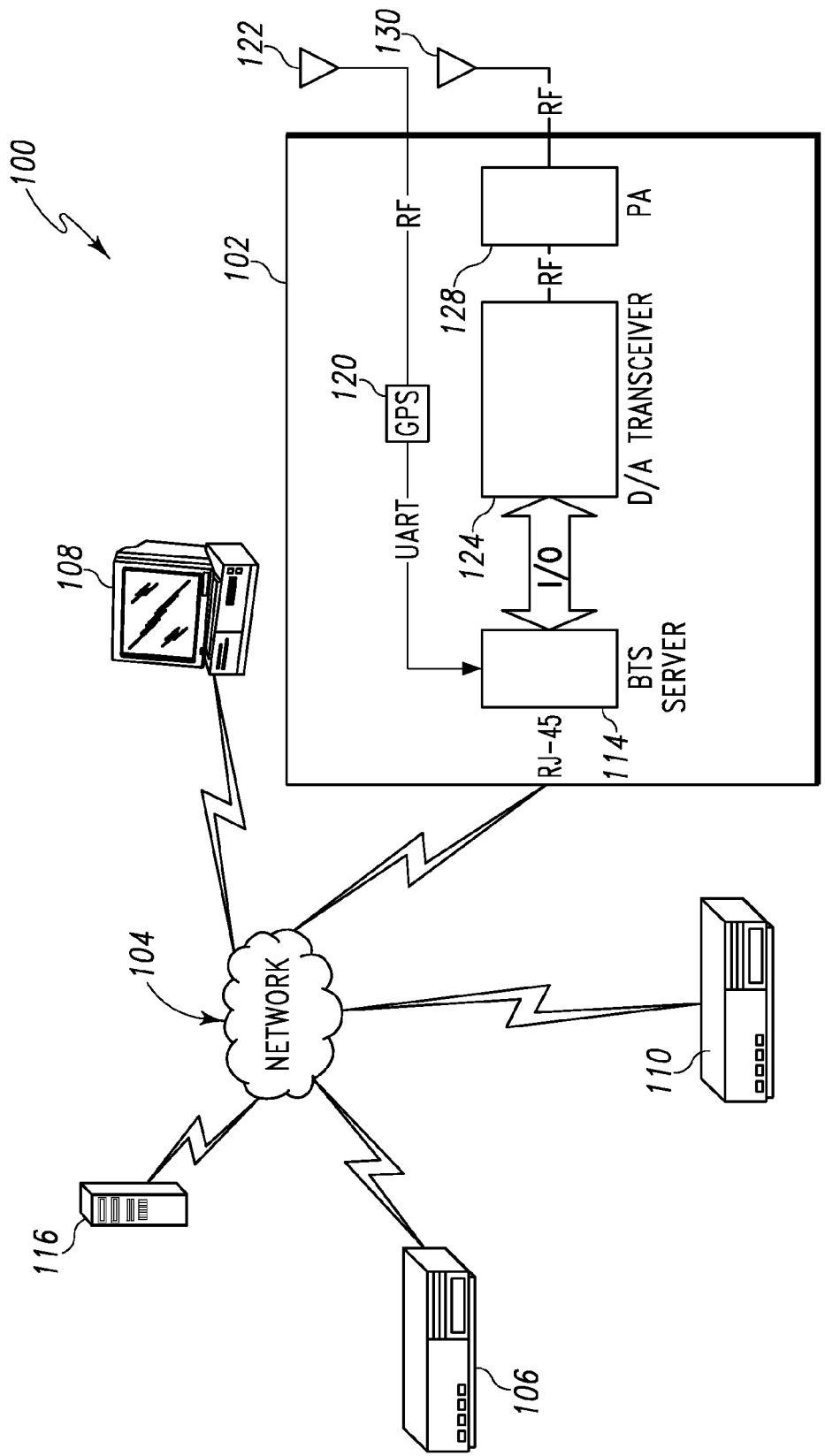
FIG. 1A is a block diagram of a earth coordinate provisioned system.

FIG. 1A shows one example of a system 100 that identifies a device by GPS coordinates. System 100 contains an IP device 102 that is connected to a Network 104. Network 104, in one embodiment is a Virtual Private Network. In one embodiment, IP device 102 is a software defined radio in a cellular radio system. IP device 102 is controlled by a Base Station Controller (BSC) 106 which is also connected to Network 104. IP device 102 and BSC 106 can therefore communication via Network 104. In one embodiment, BSC 106 is the single point of access to IP device 102.

BSC 106 exchanges information and instructions with a Network Management client 108 through a Network Management server 110. Before information can be exchanged, however, BSC 106 must be "created" in Network Management server 110. To create BSC 106, Network Management server 110 is provisioned with the IP address of BSC 106. After Network Management server 110 is provisioned, BSC 106 does not need to be discovered by Network Management server 110. Network Management server 110 simply detects the presence and operational state of BSC 106. The core configuration of BSC 106 can then be loaded into BSC 106 from a Network Management client 108 connection to the Network Management server 110.

In one embodiment, IP device 102 contains a Base Transceiver Station (BTS) Server Computer (hereafter simply called "BTS") 114. BTS 114 is the module of the IP device 102 that communicates with BSC 106. BSC 106 communicates with multiple BTSs, therefore each BTS must be provisioned by BSC 106 before any services will be provided by BSC 106. After BSC 106 is created, Network Management server 110 can detect all of the BTSs, provisioned and unprovisioned, by BSC 106.

Before BTS 114 can receive services from BSC 106, BTS 114 must obtain the network name for BSC 106 from DHCP server 116. In one embodiment, DHCP server 116 is under the control of the service provider and must have the BSC 106 network name added as an option field. BTS 114 will then look for the BSC 106 network name in the option field received from DHCP server 116. If the network name of BSC 106 is not added on DHCP server 116, BTS 114 will not attempt to locate BSC 106. Thus, if the network name of BSC 106 is not added BTS 114 can be enabled from DHCP server 116, but BTS 114 will perform no network activity.

Once BTS 114 has the network name of BSC 106, BTS 114 can identify itself to BSC 106. In one embodiment, BTS 114 sends a device identifier that is created based on the earth coordinates of BTS 114. In one embodiment, the device identifier is unique in the sense that no other device can have the same device identifier at the same time unless two or more devices share the same location with BTS 114. Hence, the device identifier is based on the location of BTS 114. If BTS 114 were moved from its current earth coordinates, BTS 114 would obtain a different device identifier. Also, if BTS 114 were replaced with another device, the new device would have the same unique device identifier formerly held by BTS 114.

In one embodiment, the earth coordinates of BTS 114 are determined by a Global Positioning System (GPS) device 120 within IP device 102 that is connected to BTS 114. In one embodiment, the earth coordinates are latitude and longitude dimensions. Alternatively, the earth coordinates could be of any unit or size sufficient to specify a location on the earth. Once BTS 114 is placed in a fixed location, BTS 114 obtains the earth coordinates for that location from GPS device 120. GPS device 120 generates the earth coordinates via signals received through antenna 122 from satellites orbiting the earth. From these signals GPS device 120 calculates the earth coordinates of the device. Alternatively, the earth coordinates for BTS 114 could be determined by manual calculation or by any other method capable of determining earth coordinates to a desired specificity. Finally, additional information, such as elevation, could be added to the earth coordinates to further describe the physical location of BTS 114.

Along with BTS 114 and GPS device 120, IP device 102 also contains a Digital/Analog Tranceiver (DATRx) 124 in parallel or serial communication with BTS 114. DATRx 124 translates the telephony to digitized radio frequency. Amplifier 128 then takes the radio frequency signal and boosts it to send over antenna 130.

Figure 1B:
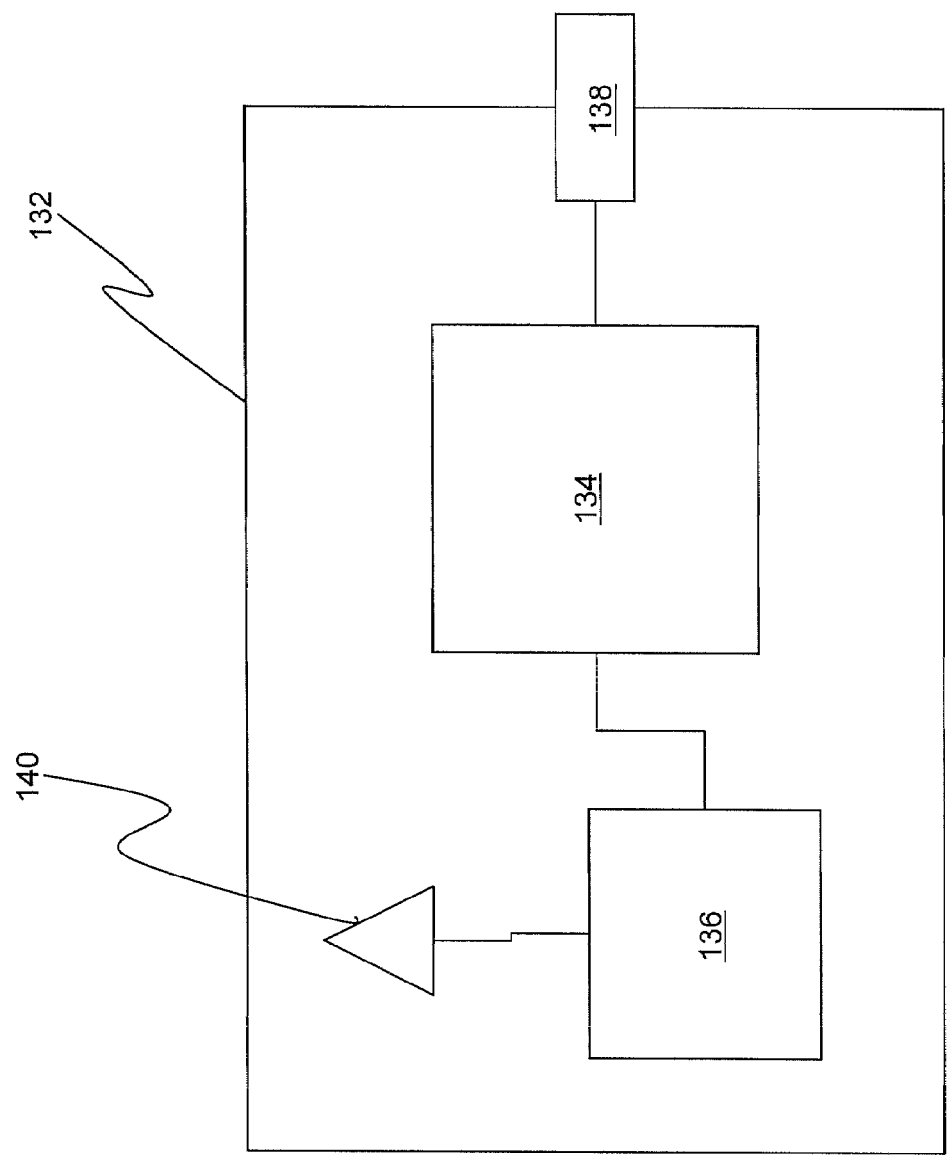
FIG. 1B is one embodiment of device that identifies itself with GPS coordinates of the present invention.

Alternatively, in a different system IP device 102 could be any device that can identify itself with GPS coordinates. FIG. 1B illustrates another embodiment of a device that identifies itself with GPS coordinates. Device 132 contains a processor 134, a GPS receiver 136, and an I/O port 138. Once device 132 is in its final location, processor 134 asks for GPS coordinates from GPS receiver 136. GPS receiver 136 reads signals from GPS satellites through antenna 140. GPS receiver 136 then calculates GPS coordinates and sends the coordinates to processor 134. Once the coordinates have been received, processor 134 translates the coordinates into a unique device identifier for device 132. Device 132 then identifies itself to other devices by processor 134 sending the unique device identifier through I/O port 138. In one embodiment, I/O port 138 is a RJ-45 jack for an Ethernet connection. In another embodiment, I/O port 138 is a coaxial jack for connecting coaxial cable. Alternatively, I/O port 138 could be of any technology sufficient to transfer data.

In one embodiment, BTS 114 incorporates the exact earth coordinates into a unique device identifier. In another embodiment, the earth coordinates of the device are input into an algorithm that determines a region that the device is in. The region of the device can then be incorporated into a unique device identifier. In another embodiment, a unique device identifier can be generated using any algorithm sufficient to allow the subsequent utilization of the earth coordinate data. Alternatively, the unique device identifier can consist of only the unchanged earth coordinates. Finally, the earth coordinates could also be formatted into a hostname for the device.

In another embodiment, once a unique device identifier has been generated, BTS 114 can then announce its presence to BSC 106. BTS 114 announces its presence by sending BSC 106 the unique device identifier generated by BTS 114. In one embodiment, the announcement from BTS 114 is addressed directly to BSC 106. In another embodiment, the announcement from BTS 114 is broadcast across the network, such that numerous devices receive the announcement. BTS 114 is auto-discovered by BSC 106 after BTS 114 announces its presence. In yet another embodiment, the BSC 106 queries all devices on a sub-net-work searching for any new BTS 114. If a new BTS 114 has been located its unique device identifier is obtained.

In one embodiment, BSC 106 receives the unique device identifier and obtains the earth coordinates of BTS 114 from the unique device identifier. This is known as the discovery of BTS 114 by BSC 106. The earth coordinates or region of BTS 114 can be obtained by simply reading them from the identifier, or by using an algorithm to translate the identifier. In one embodiment, once BSC 106 has obtained the earth coordinates of BTS 114, BSC 106 determines if BTS 114 is provisioned for services from BSC 106. BSC 106 can determine if BTS 114 is provisioned for services by comparing the earth coordinates of BTS 114 to a list of earth coordinates, or by any other method suitable to determine if a device at the earth coordinates of BTS 114 is to receive services. Alternatively, BSC 106 can be provisioned with a range of earth coordinates, with pre-defined regions, or with any other scheme to allow for flexibility in the placement of BTS 114. If a device at the earth coordinates of BTS 114 has been provisioned by BSC 106, then BSC 106 can provide services to BTS 114.

To provision BTS 114 on BSC 106, configuration data identifying BTS 114 must be added to the configuration file of BSC 106. In one embodiment, the configuration data added to the configuration files of BSC 106 identifies BTS 114 based upon the location of BTS 114. In one embodiment, the configuration files are updated by an operator that manually inputs the data.

BTS 114 can be provisioned before or after discovery by BSC 106. If BTS 114 is provisioned before discovery, then BSC 106 will provide services as soon as BTS 114 is discovered. Alternatively, if BTS 114 is discovered by BSC 106 before BTS 114 is provisioned, BSC 106 will provide services once BTS 114 is provisioned by BSC 106. The processes for provisioning before and after discovery are shown in FIGS. 2 and 3.

Figure 2:
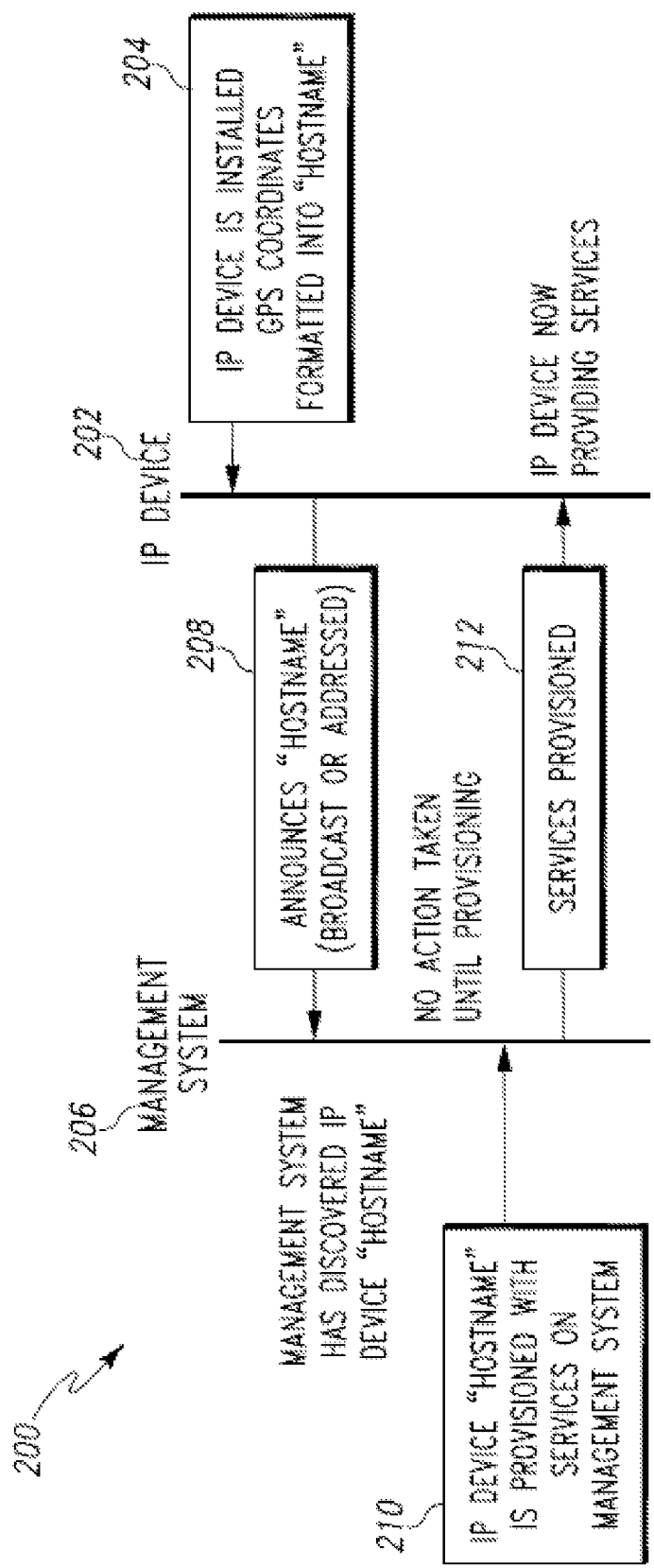
FIG. 2 is a flow diagram illustrating an example of one method of provisioning after discovery of an IP device.

FIG. 2 shows an example of a method 200 of provisioning an IP device 202 after discovery of the IP device 202. IP device 202 is installed in a fixed location. The GPS coordinates of IP device 202 are then formatted into "Hostname" (204). IP device 202 then announces "Hostname" to a management system 206 (208). The announcement can be sent by either broadcast or address. Management system 206 has now discovered IP device 202. No further action will take place with IP device 202 until provisioning for IP device 202 is completed. As soon as IP device 202 is provisioned by, for example, operator input into management system 206 (210), management system 206 can begin to provide services to IP device 202 (212). Then, IP device 202 can begin providing services of its own.

Figure 3:
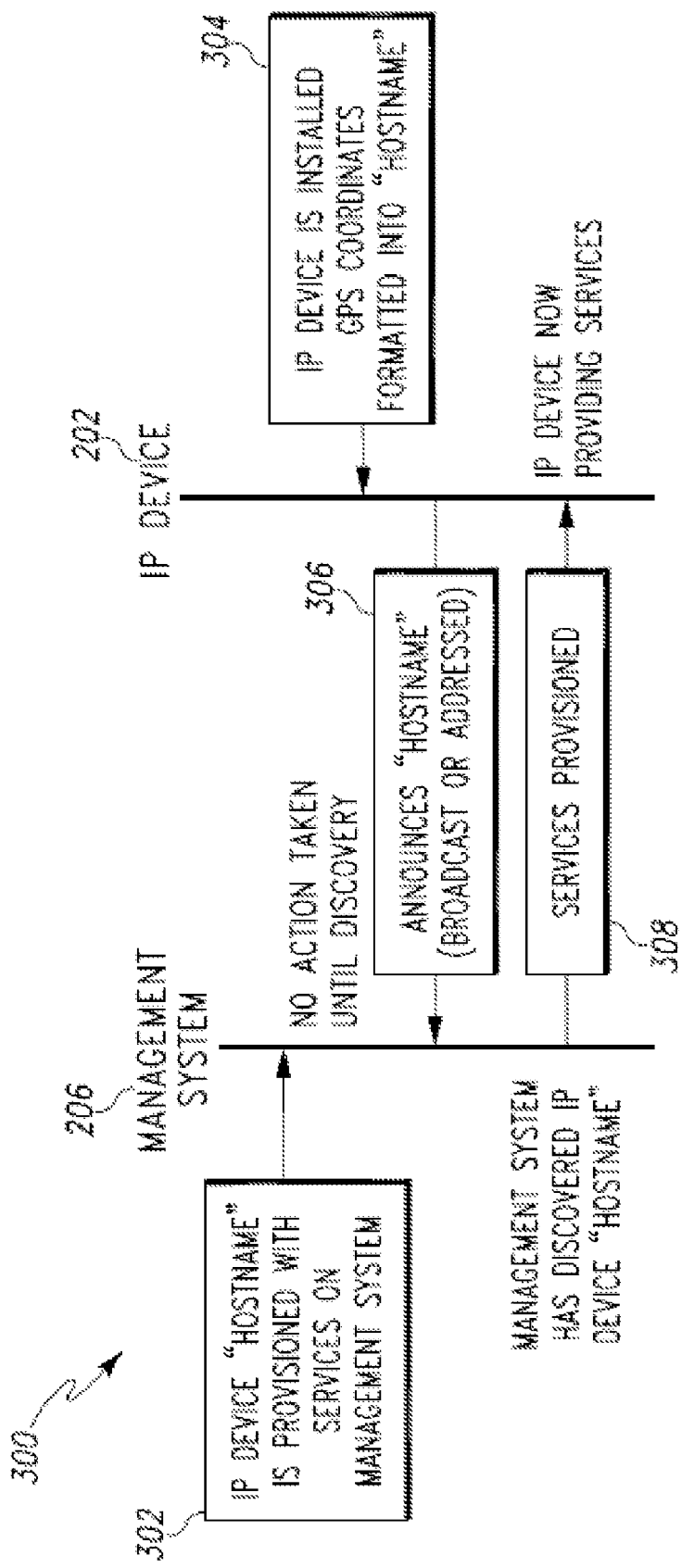
FIG. 3 is a flow diagram illustrating an example of one method of provisioning before discovery of an IP device.

FIG. 3 shows an example of a method 300 of provisioning IP device 202 before discovery of IP device 202. Here, IP device 202 is provisioned by, for example, operator input into management system 206 (302). At this point, no action will take place with IP device 202 until discovery of IP device 202 by management system 206. Once IP device 202 is installed in a fixed location, the GPS coordinates of IP device 202 are formatted into "Hostname" (304). IP device 202 then announces "Hostname" to a management system 206 (306). Here again, the announcement can be either broadcast or addressed. Now, since IP device 202 is already provisioned on management system 206, management system 206 can provision services immediately (308). IP device 202 can now begin providing services of its own.

Referring back to FIG. 1A, to replace IP device 102 with a different device, IP device 102 is disconnected from Network 104 and a new GPS identifying device is connected in its place. In one embodiment, the new device is located in the same location as the original IP device 102 location. In another embodiment, the new device is located within a certain range of the original IP device 102 location. The range of the new device can be set to any distance depending upon desired flexibility in placement. Locating the new device in the same location or within range of the same location ensures that the new device will generate the same unique device identifier as IP device 102. The new device, therefore, will automatically be provisioned by BSC 106. Moreover, in one embodiment, two or more devices that are in the same location will have the same device identifier and will both be provisioned by the BSC 106. For example, if two BTSs are used in the same location to provide cellular service for different bands they will have the same identifier. This will occur if there is just one provider or if there are different providers.

Figure 4:
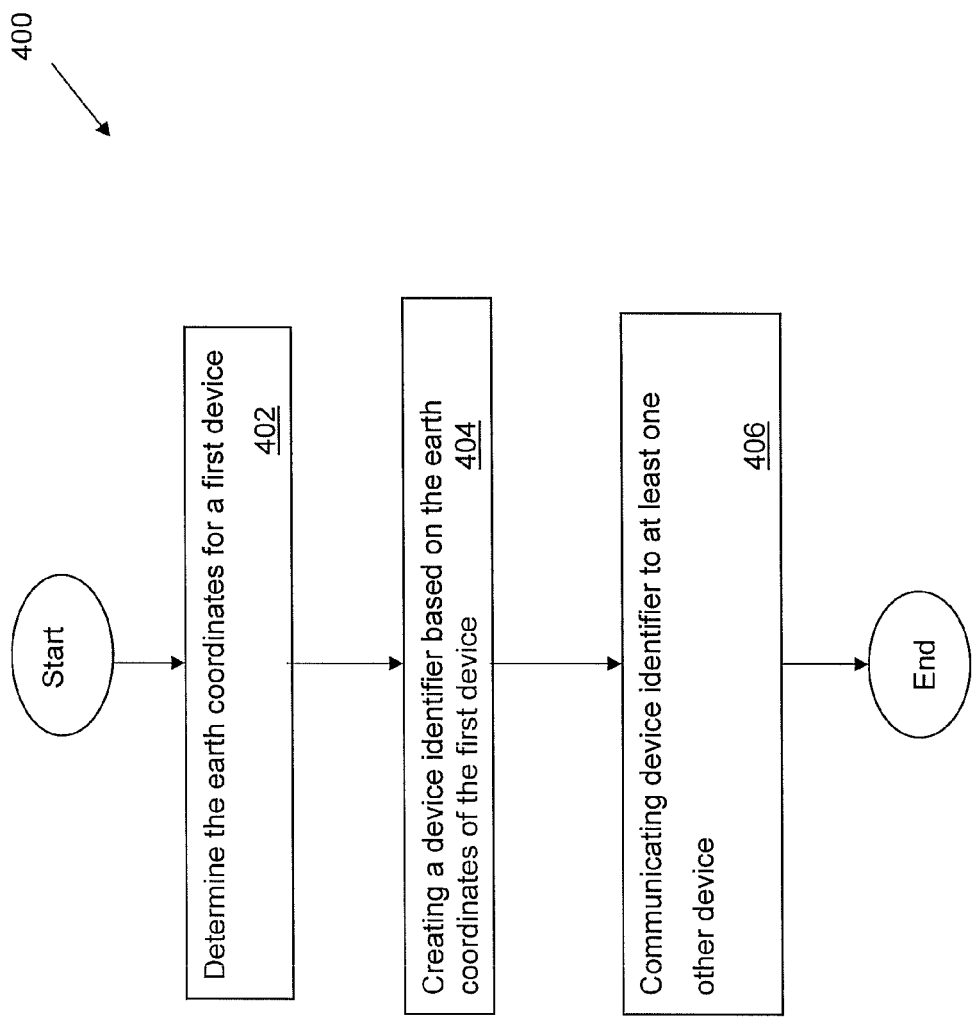
FIG. 4 is a flow diagram illustrating an example of one method of identifying a device based on earth coordinates.

A flow diagram illustrating an example of one method 400 of identifying a device with earth coordinates is shown in FIG. 4. First, the earth coordinates of a first device to be identified are determined (402). Then, the earth coordinates of the first device are incorporated into a unique device identifier (404). Finally, the device identifier is communicated to at least one other device (406). In one embodiment, the device identifier is communicated by the first device announcing its presence to the at least one other device. In another embodiment, the at least one other device polls a network or sub-network upon which the device in communication with to discover the device identifier.

Figure 5:
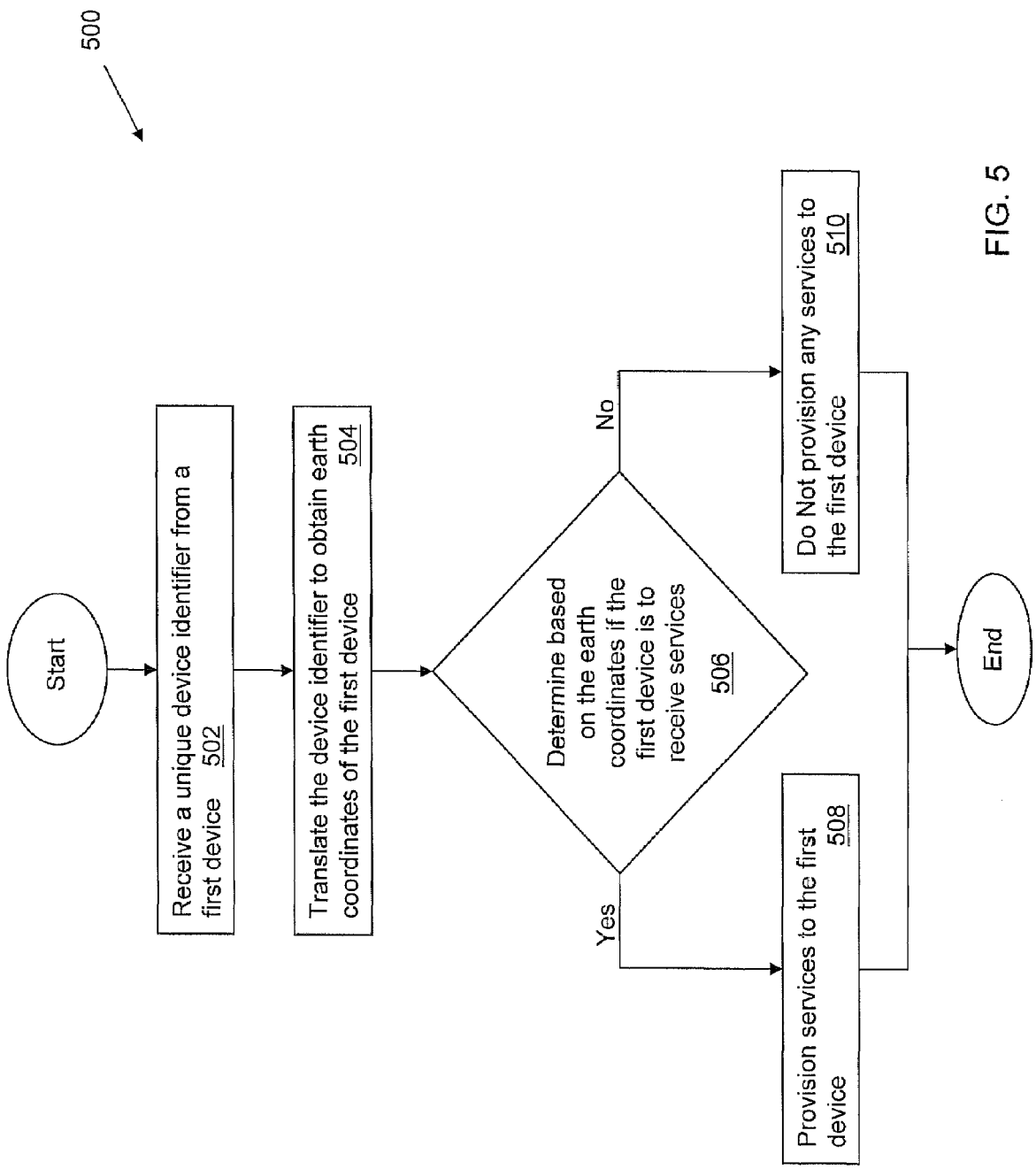
FIG. 5 is a flow diagram illustrating an example of another method of identifying a device based on earth coordinates.

FIG. 5 illustrates a flow diagram of one method 500 of provisioning services to a device. First, a management system receives a unique device identifier from a first device (502). Second, the management system translates the device identifier to obtain the earth coordinates of the first device (504). Next, the management system uses the earth coordinates of the first device to determine if a device at the location of first device is to receive services from the management system (506). If a device at the location of first device is to receive services, then the management system provisions services to the first device (508). If the management system determines that a device at the location of first device is not to receive services, then the management system does not provision services to the first device (510).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of identifying a device comprising:

receiving an IP address at a first device;

determining earth coordinates for the first device;

creating a device identifier, separate from the IP address and based at least in part on the earth coordinates of the first device;

communicating the device identifier to at least one other device using the IP address and the device identifier of the first device; and provisioning services for the first device on the at least one other device based on the device identifier from the first device.

2. The method of claim 1, wherein communicating the device identifier further comprises:
announcing the first device to the at least one other device by sending the device identifier from the first device to the at least one other device.

3. The method of claim 1, wherein communicating the device identifier further comprises:
polling a sub-net-work with the at least one other device to discover the device identifier of the first device.

4. The method of claim 1, further comprising:
determining based on the earth coordinates from the device identifier whether to provide services to the first device with the at least one other device.

5. The method of claim 1,
wherein provisioning services for the first device on the at least one other device comprises provisioning services prior to receiving the device identifier from the first device.

6. The method of claim 1, wherein creating the device identifier further comprises formatting the earth coordinates into a hostname.

7. The method of claim 1, further comprising:
fixing the first device in a permanent location.

8. The method of claim 1, further comprising:
determining the elevation of the first device; and
incorporating the elevation of the first device into the device identifier.

9. The method of claim 1, wherein determining the earth coordinates further comprises:
determining the latitude and longitude of the first device.

10. The method of claim 1, wherein determining earth coordinates further comprises:
using a GPS device to obtain earth coordinates.

11. The method of claim 1, further comprising:
running the earth coordinates through an algorithm to determine the region in which the first device is located.

12. The method of claim 11, wherein creating a device identifier further comprises:
incorporating a region in which the first device is located into the device identifier.

13. The method of claim 12, wherein the incorporating the device identifier into a region is performed by the first device.

14. The method of claim 12, wherein the incorporating the device identifier into a region is performed by the at least one other device.

15. A method of provisioning services to a device comprising:
receiving a device identifier from a first device using an IP address separately assigned to the first device;
obtaining an earth location of the first device from the device identifier;
determining based on the earth location whether the first device is to receive services; and
provisioning services, based on the earth location, to the first device if the first device is to receive services.

16. The method of claim 15, wherein obtaining the earth location further comprises obtaining the latitude and longitude coordinates of the first device.

17. The method of claim 15, wherein obtaining the earth location further comprises obtaining a region in which the first device is located.

18. The method of claim 15, further comprising provisioning services for the first device on the receiving device prior to the step of receiving the device identifier.

19. The method of claim 15, wherein obtaining the earth location further comprises translating the device identifier to enable extraction of the earth location.

20. The method of claim 15, wherein obtaining the earth location further comprises obtaining the elevation of the first device.

21. A system for identifying a device by earth coordinates, the system comprising:
one or more devices having a device identifier that incorporates the earth coordinates of the device, each of the one or more devices further having a separately assigned IP address associated with the one or more devices;
a management system configured to provision services to select of the one or more devices based on the device identifiers of those devices;
a network connected to the one or more devices and the management system operable to transfer data between the one or more devices and the management system; and
wherein each of the one or more devices communicates its device identifier over the network using its IP address and its device identifier to at least one other of the one or more devices.

22. The system of claim 21, further comprising:
a global positioning system receiver in communication with the one or more devices.

23. The system of claim 22, wherein the GPS receiver is integral with the one or more devices.

24. The system of claim 21, wherein the network transfers data using Internet Protocol.

25. The system of claim 21, wherein the one or more devices is a modem.

26. The system of claim 21, wherein the one or more devices is a base transceiver station.

27. A device having an identifier based on the location of the device, the device comprising:
a GPS receiver;
a processor in communication with the GPS receiver and operable to incorporate GPS coordinates from the GPS receiver into a device identifier;
an output unit in communication with the processor and operable to transmit the device identifier to another device using an IP address separately assigned to the device; and
wherein the device provides services provisioned to the device and wherein the provisioned services are based on the device identifier.

28. The device of claim 27, wherein the output is an RJ-45 output.

29. The device of claim 27, wherein the output is a coaxial cable jack.

* * * * *